(12) United States Patent
Wallace et al.

(10) Patent No.: US 6,182,711 B1
(45) Date of Patent: Feb. 6, 2001

(54) METHOD AND APPARATUS FOR FILLING ELECTRICAL ENERGY STORAGE DEVICES

(75) Inventors: Earl DeWayne Wallace, Pendleton; Clarence Alfred Meadows; Thomas Kent Lacy, both of Muncie; Charles Cletis Montgomery, Alexandria, all of IN (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/438,589

(22) Filed: Nov. 12, 1999

(51) Int. Cl.⁷ ..................................................... H01M 4/82
(52) U.S. Cl. ................. 141/1.1; 141/32; 141/34; 141/234; 141/237
(58) Field of Search ................................ 141/1.1, 31, 32, 141/34, 59, 234, 237, 238, 239; 29/623.1, 623.5

(56) References Cited

U.S. PATENT DOCUMENTS

| | | | |
|---|---|---|---|
| 4,146,063 | * 3/1979 | Karlsson | 141/1.1 |
| 5,487,417 | * 1/1996 | Kasahara et al. | 141/32 |
| 5,730,192 | * 3/1998 | Park | 141/34 |

\* cited by examiner

*Primary Examiner*—Timothy L. Maust
(74) *Attorney, Agent, or Firm*—Margaret A. Dobrowitsky

(57) ABSTRACT

A multi-station machine for filling storage batteries has an unloading station, a loading station and a filling station. At the unloading station, a filled battery case is removed from a pivotally mounted cradle assembly including an acid container. At the loading station, adjacent the unloading station, the battery case is loaded in the cradle assembly in a vertical orientation and then tilted to and latched in an angular orientation. At the filling station, the battery case and acid container are further tilted to a horizontal orientation, the container is filled with acid and then returned to the tilted and latched orientation. When all of the cradle assemblies are filled with battery cases and acid container are filled with acid, the cradle assemblies, are spun at a speed sufficient to rotate the assemblies to a more tilted orientation to cause centrifugally induced flow of the acid into the battery case while simultaneously unlatching the cradle assemblies. The machine speed is slowed and the cradle assemblies return to the vertical orientation for unloading.

6 Claims, 10 Drawing Sheets

METHOD AND APPARATUS FOR FILLING ELECTRICAL ENERGY STORAGE DEVICES

TECHNICAL FIELD

This invention relates to electrical energy storage devices such as lead acid batteries and more particularly to a method and apparatus for filling such devices.

BACKGROUND OF THE INVENTION

Lead-acid batteries have a casing with a plurality of internal, paste filled, grid plates and separators that are submerged in acid. The grid plates and separators are tightly compacted elements. During the manufacture of the batteries it is necessary to fill the case with the acid after the grid plates are installed. It is imperative to completely fill the case and also to fully saturate the separators. This can be a time consuming operation which increases the cost of production as the fill time increases, particularly when the separators are made with absorbent glass mat material.

Many methods have been considered or undertaken in an effort to reduce the fill time. It has been proposed to roll the battery case to lie on one side and then partially submerge the case in an acid bath. This method results in an unknown quantity of acid fill and is too time consuming. Another method that has been considered also lays the battery case on the side and attaches a manifold to ports on the "top" so that acid can be metered into the case through the manifold. This method is also very time consuming and total saturation of the separators is virtually impossible.

Yet another method that has been considered includes applying a vacuum to the case to evacuate the air and introduce acid into the interior of the case. This method results in dry spot in the separators and acid damage to the vacuum equipment. Still another method used a pulse vacuum to evacuate the air while acid is introduced through the bottom of the case. The case could not be reliably sealed following the fill operation. A further method included pouring acid directly into the top of the battery case. This method results in trapped air, which creates dry spots in the separators, insufficient acid fill and excessive fill time.

SUMMARY OF THE INVENTION

It is an object of the present invention to provide an improved method and apparatus for filling electrical energy storage devices.

In one aspect of the present invention, a method of centrifugal filling batteries is employed. In another aspect of the present invention, a battery is loaded into a filling machine in a vertical attitude beneath an acid container. In yet another aspect of the present invention, the battery case and acid container are pivoted to and latched in an angular orientation.

In still another aspect of the present invention, the battery case and acid container are rotated to a speed sufficient to cause further pivoting of the assembly to open a flow path for the acid to fill the battery case. In yet still another aspect of the present invention, a centrifugally responsive latch mechanism released the assembly to return to the vertical positioning when the rotation is discontinued after the battery case is filled. In a further aspect of the present invention, an unloading station, a loading station and a filling station are provided in sequential order on a multi-station machine. In yet a further aspect of the invention, the battery case and acid container assembly is tilted to the horizontal position in the filling station.

DESCRIPTION OF AN EXEMPLARY EMBODIMENT

Figure 1:
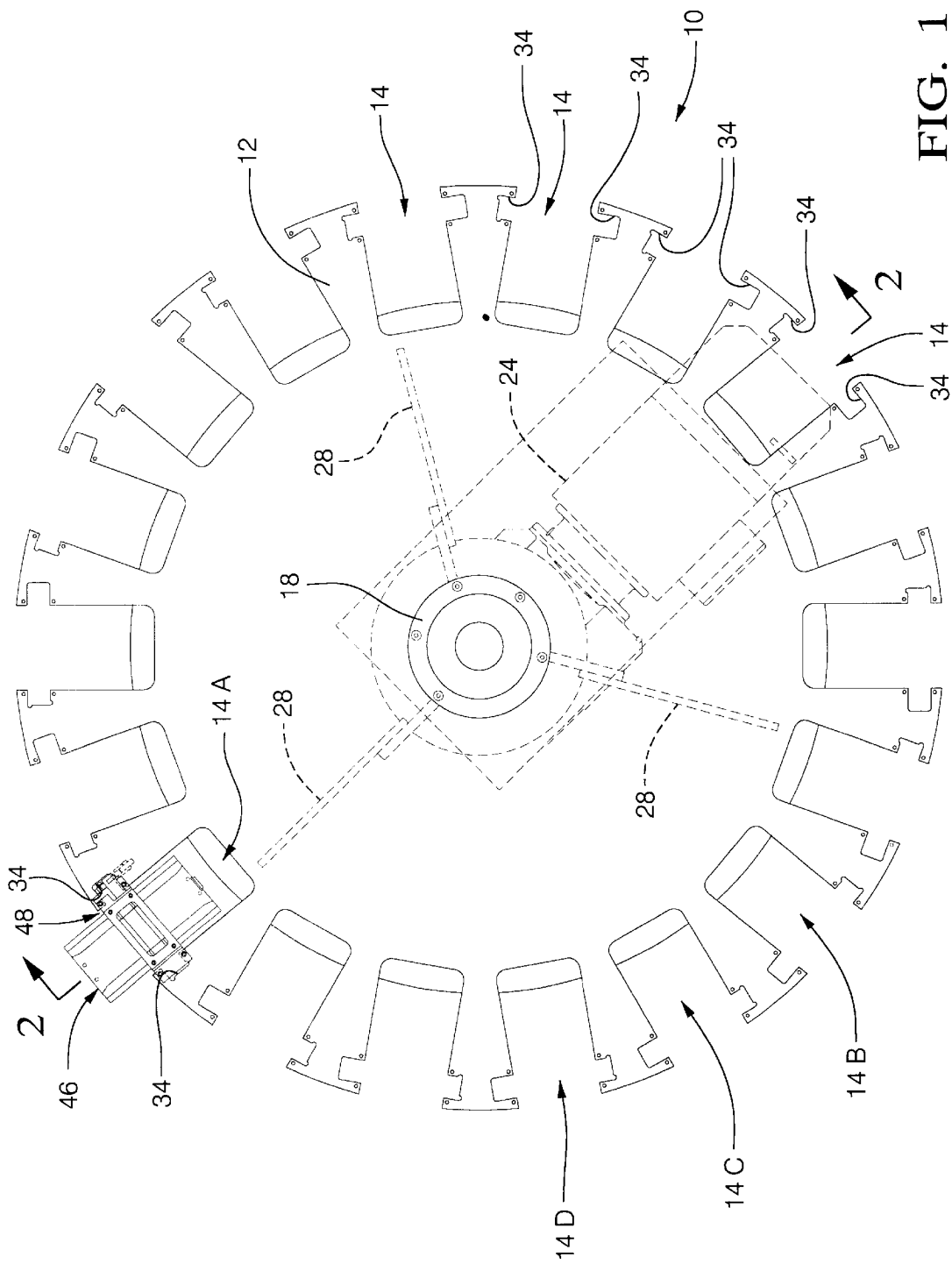
FIG. 1 is a top view of a battery filling machine incorporating the present invention.
Figure 2:
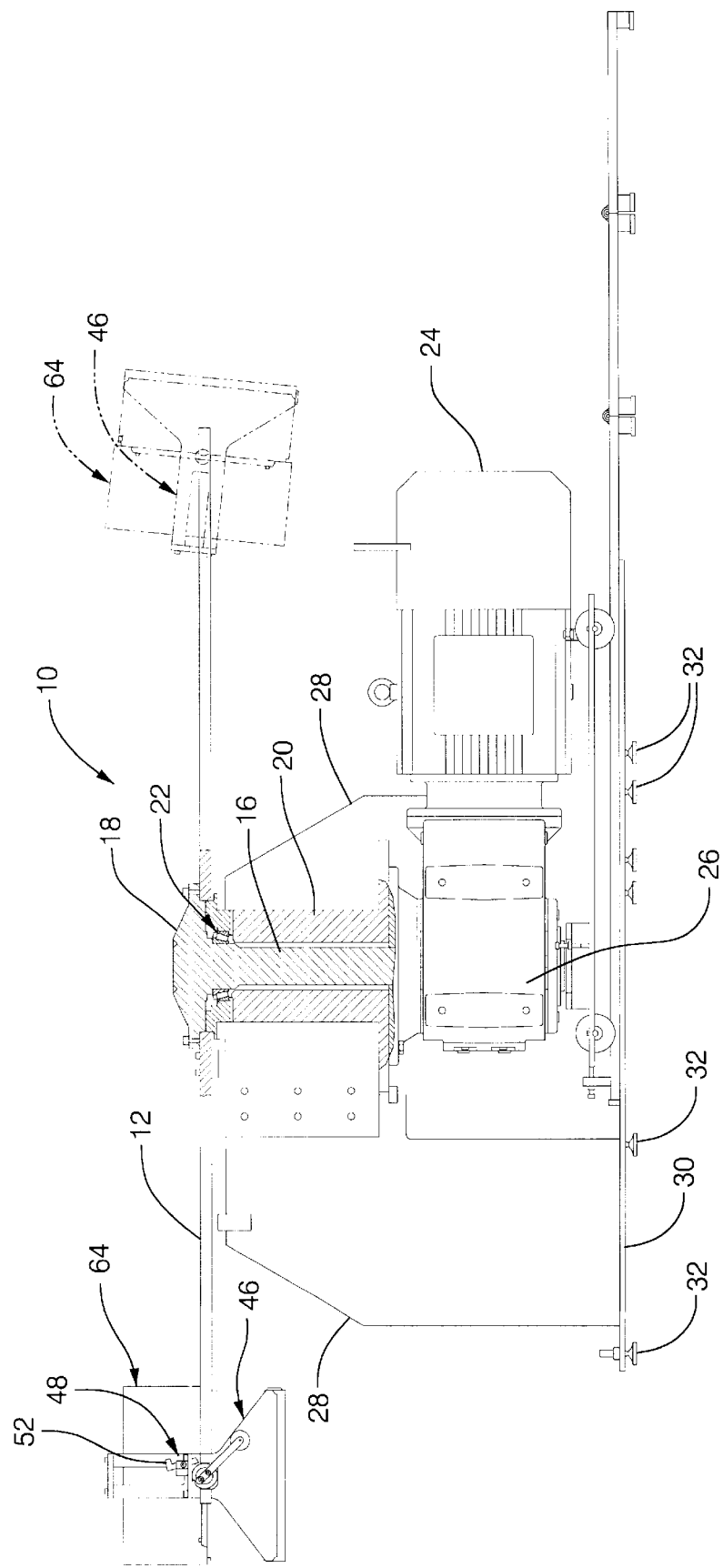
FIG. 2 is a plan view of the battery filling machine.
Figure 3:
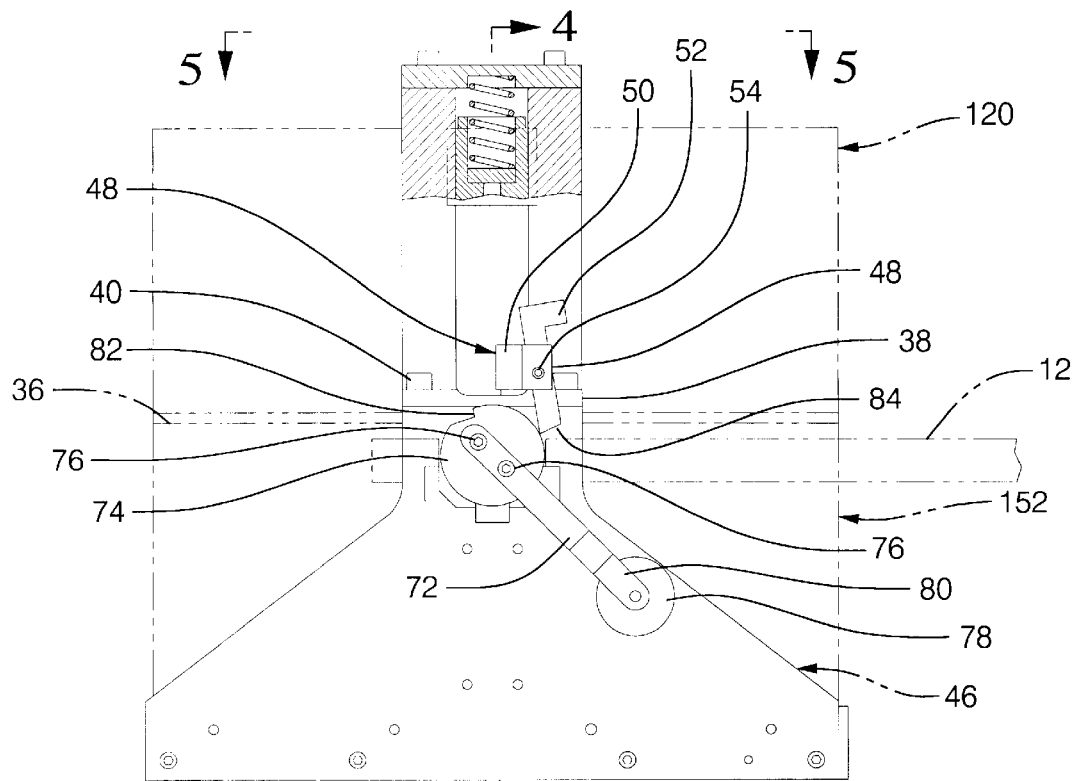
FIG. 3 is a plan view of a battery case and acid container mounted in one of the stations of the filling machine in a vertical orientation.
Figure 4:
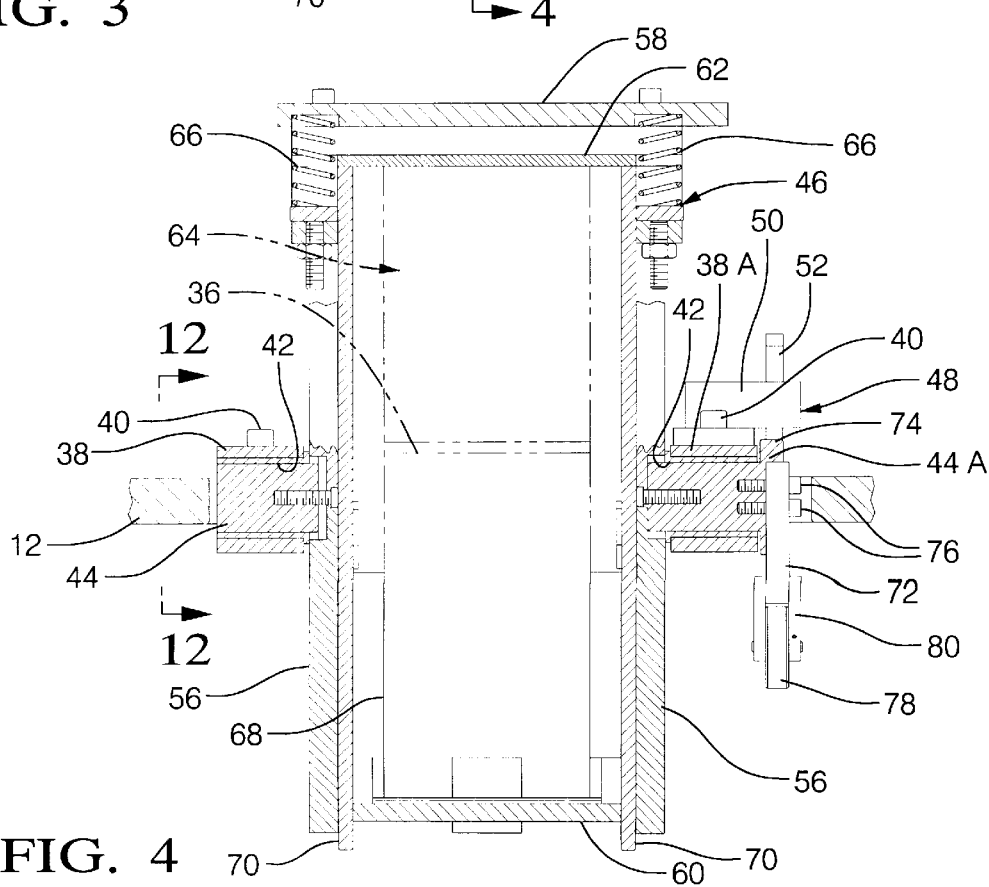
FIG. 4 is a view taken along line 4—4 in FIG. 3.
Figure 5:
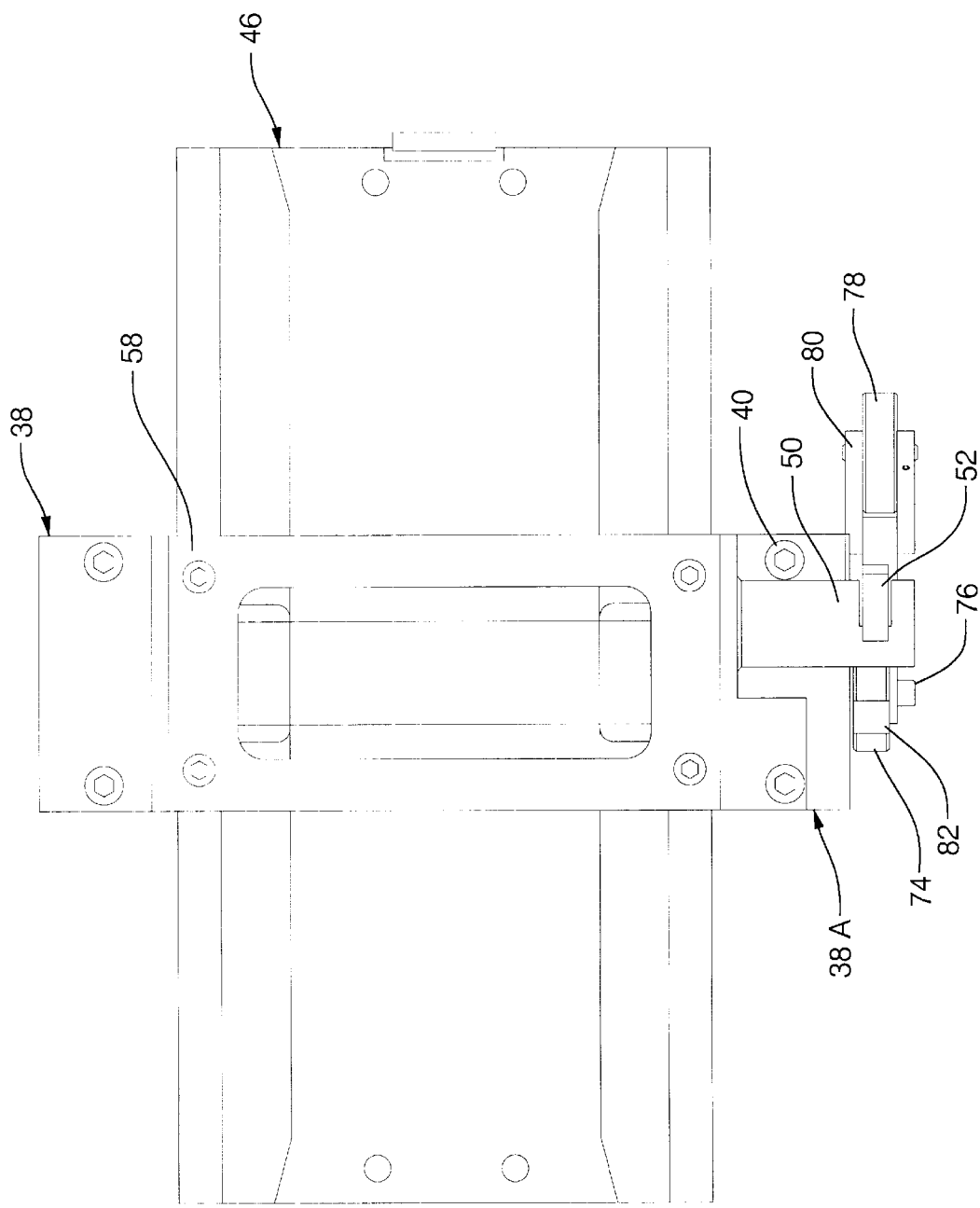
FIG. 5 is a view taken along line 5—5 in FIG. 3.

Referring to the drawings wherein like characters represent the same or corresponding parts throughout the several views there is seen in FIGS. 1 and 2, a battery filling machine 10 including a work table 12 in the form of a plate or disc in which is formed a plurality of stations 14. In the embodiment shown, eighteen stations are illustrated which permits twenty degrees of spacing between the stations. The work table 12 is drivingly connected with a shaft of spindle or shaft 16 through a hub 18. The hub 18 is mounted for rotary and vertical support on a stanchion 20 by a tapered roller bearing 22.

The spindle 16 is drivingly connected with a conventional electric motor 24 through a conventional gear box 26. Conventional motor controls, not shown, control the speed of the motor between zero and approximately three hundred (300) rpm. The speed of the motor is dependent on the radius at which the stations are formed. The stanchion is mounted on three equiangularly spaced legs 28. The legs 28 are secured to a base plate 30 that has a plurality of leveling feet 32.

Figure 12:
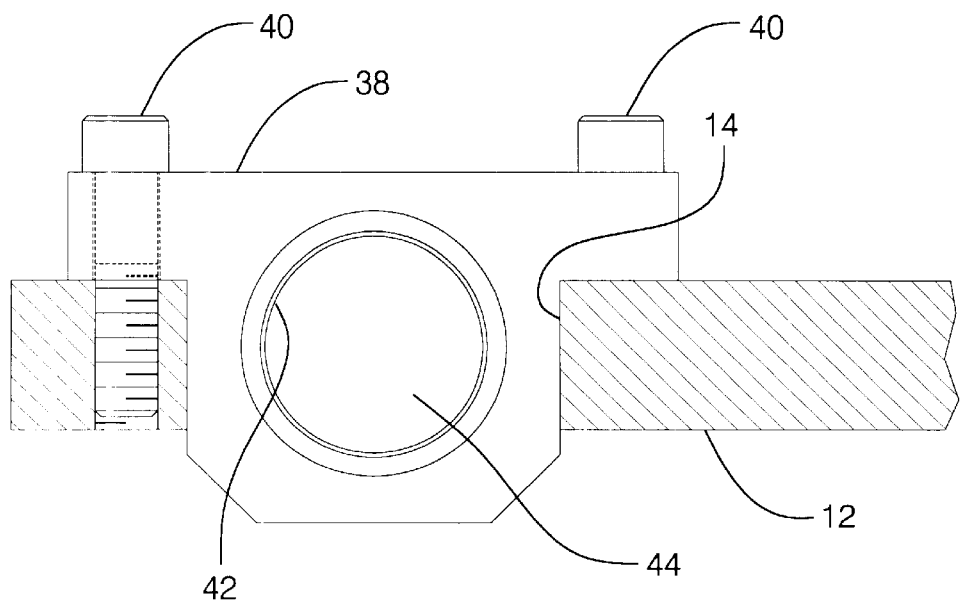
FIG. 12 is a view taken along line 12—12 in FIG. 4.

Each station 14 has two trunnion support openings 34 in which a cradle assembly 46 is positioned as shown at station 14A in FIG. 1. A trunnion 38 is secured in each opening 34 when the assembly 46 is loaded on the work table 12. As shown in FIG. 12, the trunnions 38 are secured to the work table 12 by threaded fasteners 40. Each trunnion 38 has an opening 42 in which a shaft 44 is rotatably mounted. The shaft 44 is a component of the cradle assembly 46 in which an acid container 64 and gasket 36 are secured. One of the trunnions 38A has a latch assembly 48 secured thereto, as seen in FIGS. 1, 2, 3, 4 and 6. The latch assembly 48 includes a bracket 50 and a latch lever 52 pivotally mounted on the bracket 48 with a pin 54.

As previewed in the preceding paragraph, when a general reference is made to a plurality of like components, the general numerical designation, such as station 14, will be used. When a specific reference is made to one of the plurality of components, an alpha-numeric designation, such as station 14A, will be used.

The cradle assembly 46 has a pair of spaced side walls 56 to which the shafts 44 are secured. And upper plate 58 and a lower plate 60 are secured to the side walls 56. A spring biased plate 62 is urged against the acid container 64 by springs 66 compressed between the upper late 58 and a bracket secured to the plate 62. The springs 66 urge the cam plate 62 against the acid container 64. A battery case 68 is secured to the acid container 64 with the gasket 36 squeezed therebetween by the spring pressure created between the plate 62 and the lower plate 60. A pair of lifting rods 70 are provided to compress the springs 66 and lift the acid container 64 and gasket 36 when loading and unloading of the battery case 68 to or from the cradle assembly 46 is undertaken.

Figure 13:
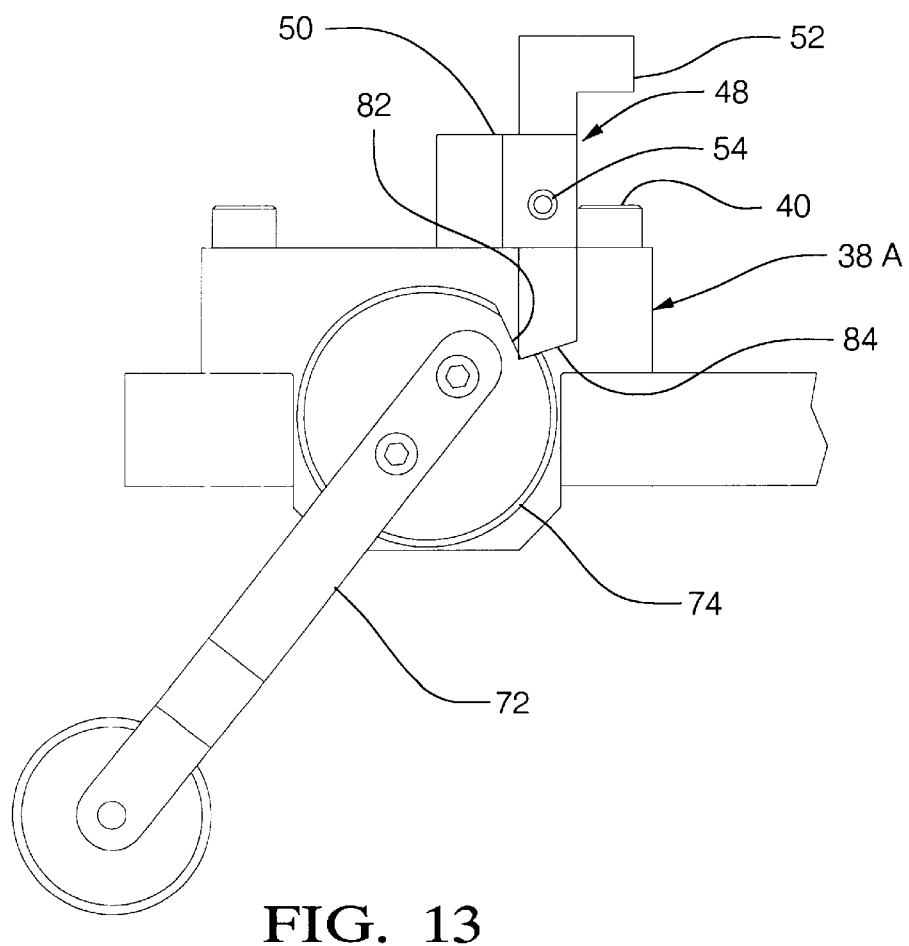
FIG. 13 is a view similar to FIG. 12 showing a latch mechanism in a latched condition.

Each shaft 44A has a lever 72 and cam wheel 74 attached thereto by fasteners 76. A roller 78 is rotatably mounted on the lever 72 through a bracket 80. Pivoting of the lever 72 will cause the cradle assembly 46 to rotate relative to the work table 12 while the trunnions 38 and the bracket 50 of the latch assembly 48 are fixed relative to the work table 12. The can wheel 74 has a notch portion 82 that is engaged by an end 84 of the latch lever 52 when the cradle assembly 46 has been rotated through a predetermined angle, as shown in FIG. 13. With the exemplary embodiment, an angle of eighty-five degrees has been found sufficient for the purposes of the present invention. Those skilled in the art will recognize that the center of gravity of the latch lever 52 is vertical of and radially inward of the pivot pin 54. Thus, in the stationary position shown in FIG. 13, the latch lever 52 is urged to rotate clockwise about the pin 54 to enforce engagement with the notch 82. However, when the work table 12 is rotating, centrifugal force will urge the latch lever 52 to rotate counter-clockwise about the pin 54 to release engagement from the notch 82.

The work table 12 is rotated by the motor 24 to position the station 14B at an unload station, the station 14C at a loading station and the station 14D at a filling station.

Figure 6:
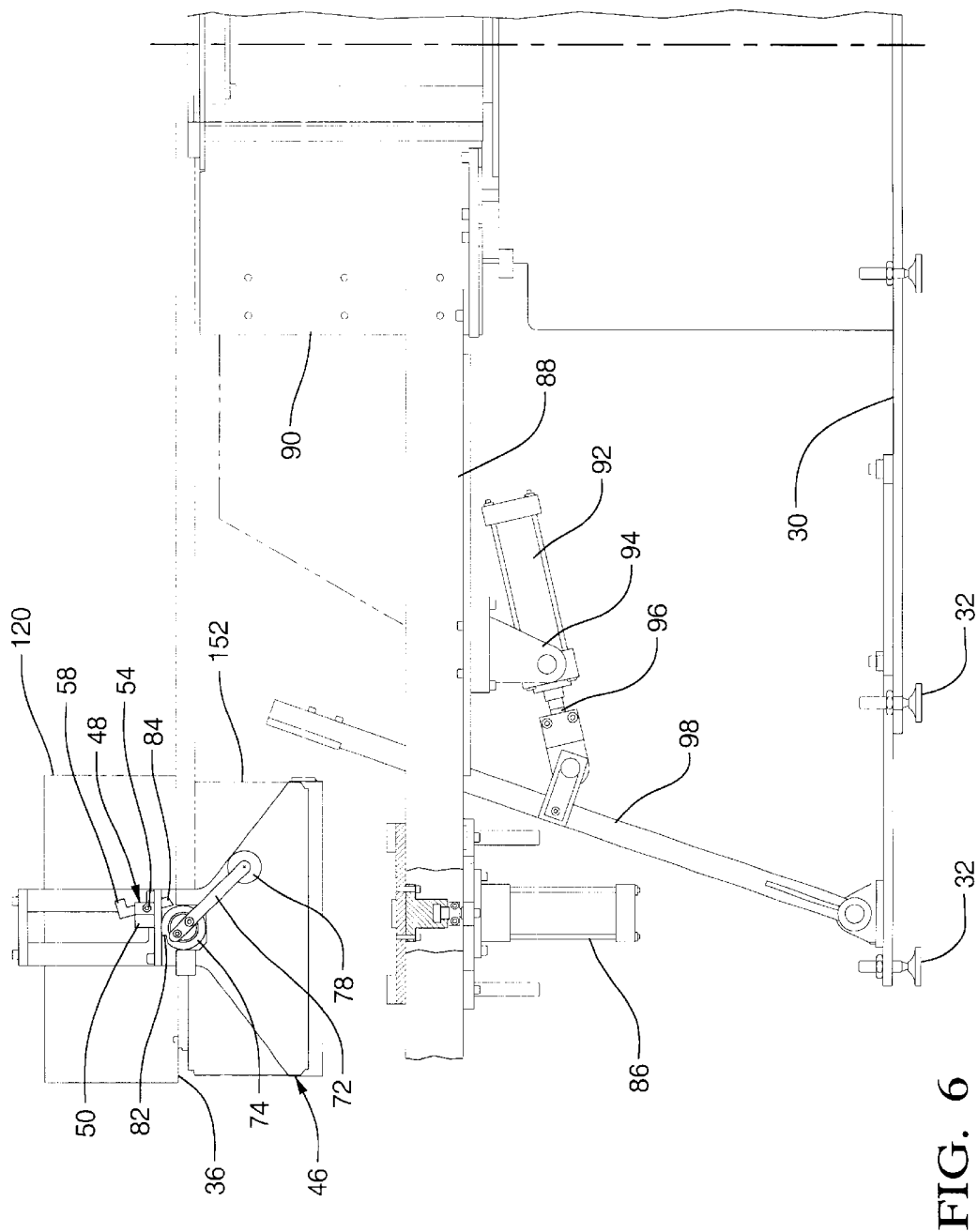
FIG. 6 is a plane view of the loading station of the machine with a battery case and acid container in a vertical orientation.

In the loading station, shown in FIG. 6, the power cylinder 86 raises the lifting rods 70 which raises the acid container 64 and the gasket 36 allowing an unfilled battery case 68 to be inserted beneath the acid container 64. The power cylinder 86 then releases the lifting rods 70 causing the battery case 68 to be secured in the cradle assembly 46. The power cylinder 86 is secured on a beam 88 which extends from a support 90 secured to the base 30. The beam 88 also has a power cylinder 92 pivotally mounted thereon through a bracket 94. A rod portion 96 of the cylinder 92 is pivotally connected with a lever 98 which is pivotally mounted on the base 30. After an empty battery case 68 is inserted and secured in the cradle at the loading station, the power cylinder 92 is actuated such that the lever 98 will contact the roller 78 thereby causing the lever 72 to rotate the cradle assembly 46 to the tilted position shown in FIG. 13 with the acid container radially inward of the battery case. The work table 12 is indexed to position the tilted cradle assembly to the filling station.

The apparatus used in the unloading station, to position the batteries, is substantially the same as the apparatus used in the loading station except that the unloading station does not need a tilting apparatus. In the unloading station, a power cylinder 86 raises the lifting rods 70 which raises the acid container 64 and the gasket 36 thereby releasing the clamping pressure from the battery case 68. The battery case 68 is then ejected from the cradle assembly 46. The power cylinder 86 then lowers the lifting rods 70 thereby lowering the acid container 64 to a rest position. The work table 12 is then indexed to position the emptied station 14 to the loading station.

Figure 7:
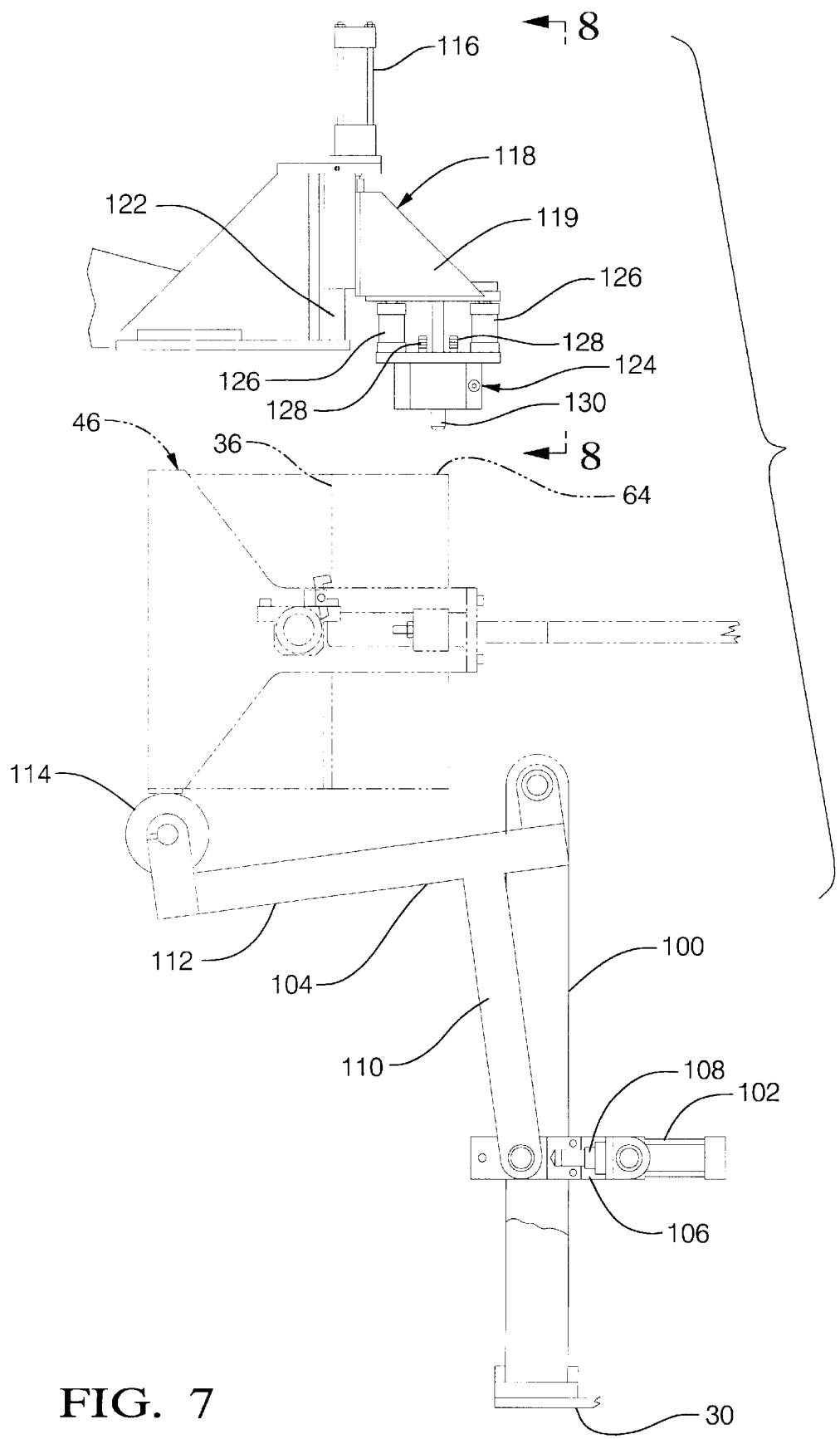
FIG. 7 is a plan view of the filling station of the machine with the battery case and acid container shown in phantom line in a horizontal orientation.
Figure 8:
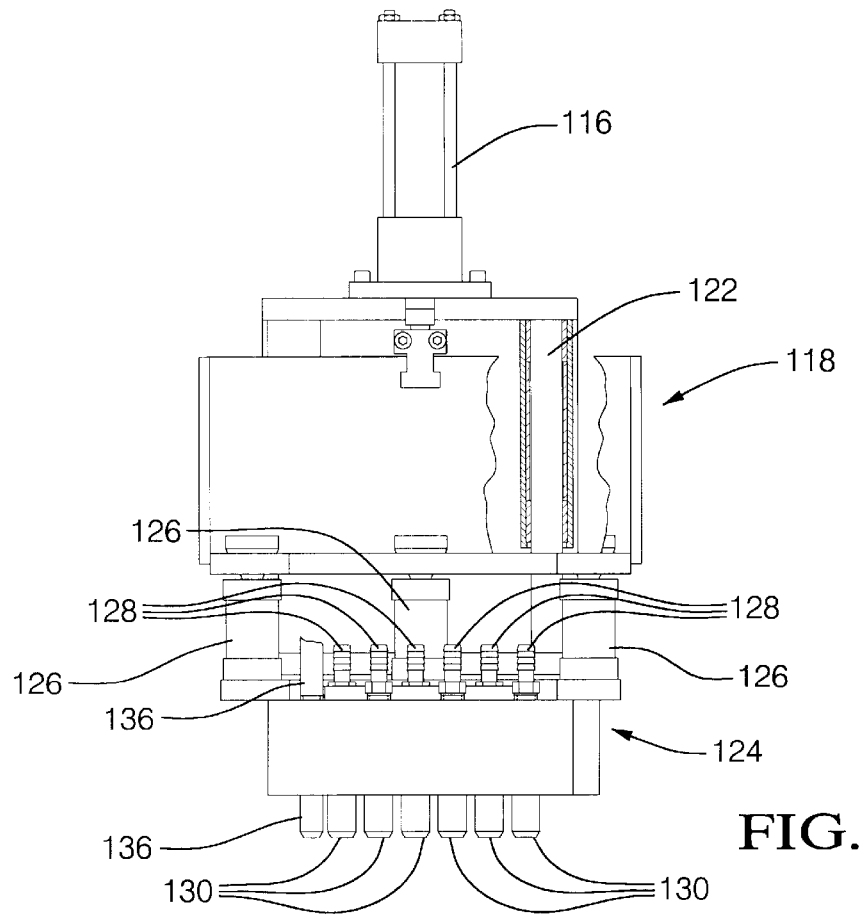
FIG. 8 is a view taken along line 8—8 in FIG. 7.
Figure 10:
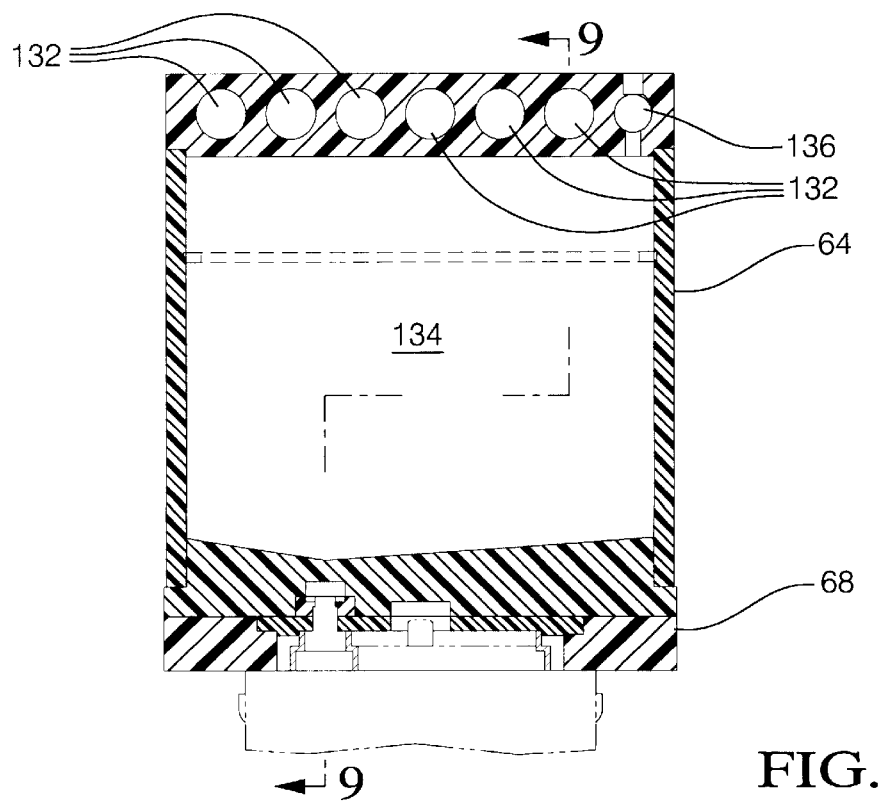
FIG. 10 is a sectional view taken along line 10—10 in FIG. 9.
Figure 9:
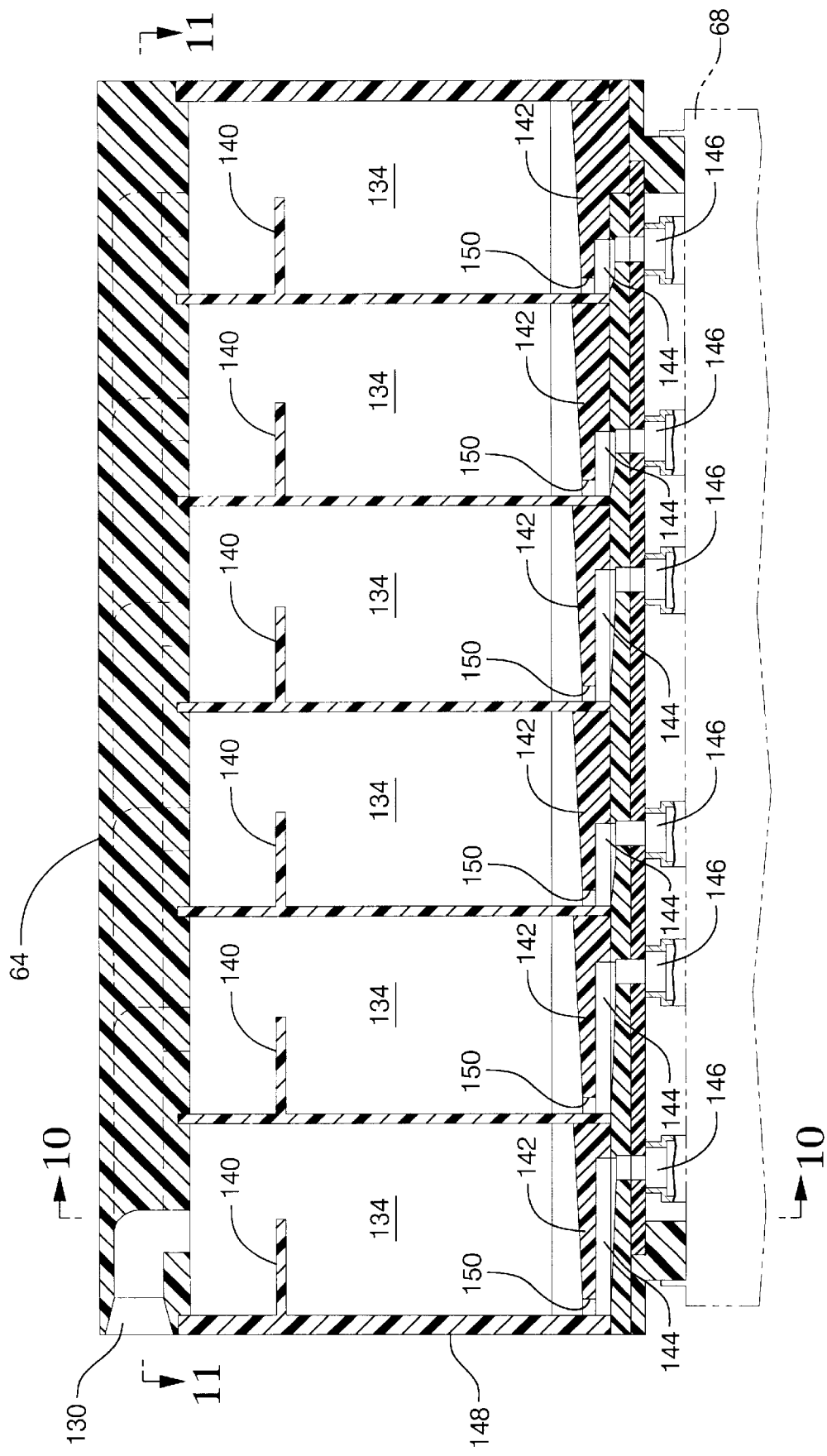
FIG. 9 is a sectional view of the acid container taken along line 9—9 in FIG. 10.
Figure 11:
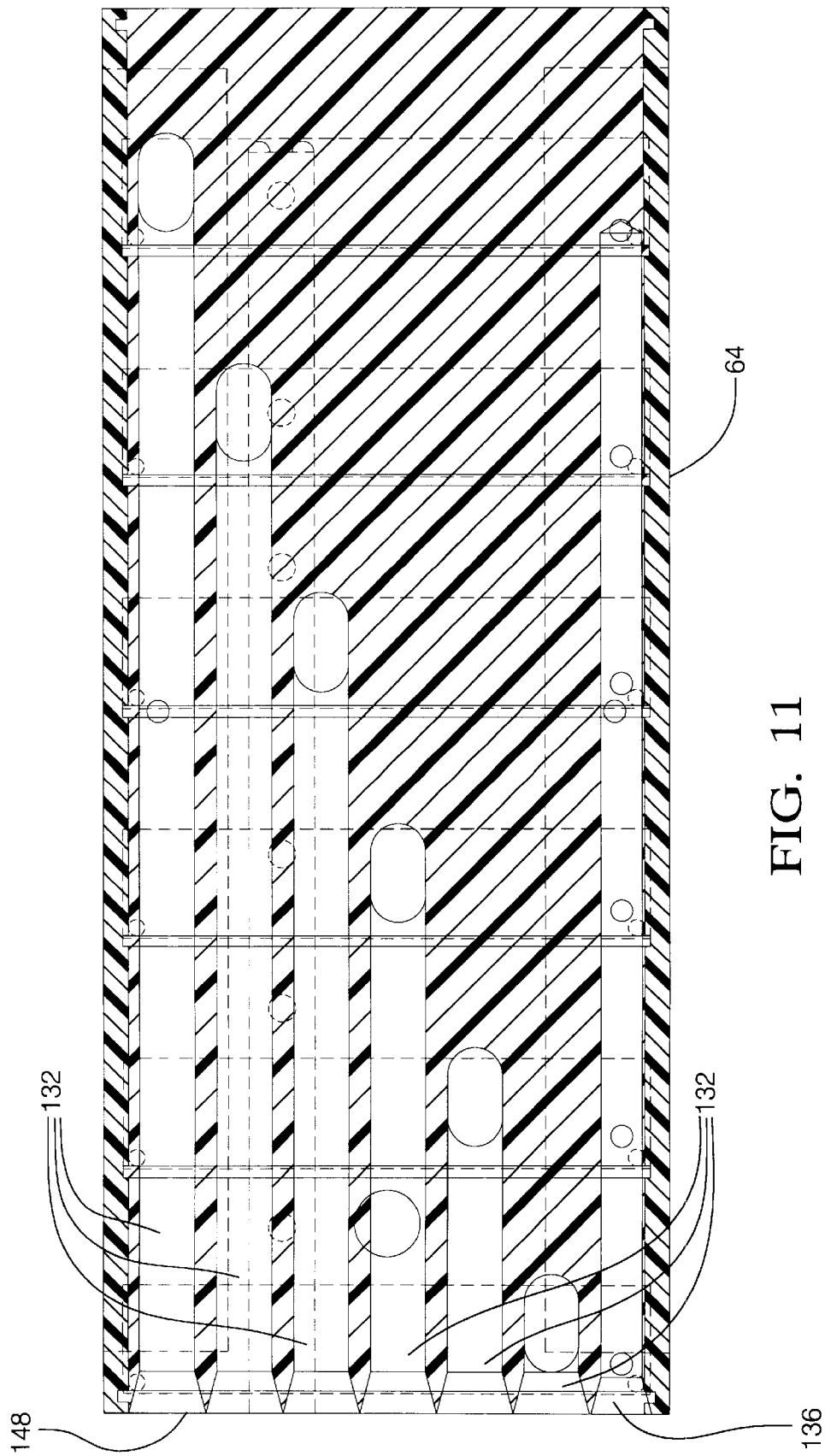
FIG. 11 is a sectional view taken along line 11—11 in FIG. 9.

The filling station, shown in FIG. 7, has a stanchion 100 on which a power cylinder 102 and a lever 104 are mounted. The power cylinder 102 is mounted on a bracket 106 and has a rod 108 aligned to contact one arm 110 of the lever 104. The lever 104 has another arm 112, substantially perpendicular to the arm 110, that is pivotally mounted on the stanchion 100. A roller 114 is rotatably mounted on the arm 112. When the power cylinder 102 is actuated, the arm 104 is pivoted such that the roller 114 will contact the cradle assembly 46. Through this action the cradle assembly 46 and the battery case 68 are rotated in the trunnions 38 to the horizontal position shown. When this attitude is achieved, a power cylinder 116 will lower a filling assembly 118 into position to fill the acid container 64 with acid.

The filling assembly 118 has a bracket 119 which is slidably mounted on rods 122 for vertical movement under the influence of the power cylinder 116. A valve assembly 124 is secured to the bracket 119 through leveling compensators 126. The valve assembly 124 has inlet tube connection 128 that are connected by tubing, not shown, to an acid supply, not shown. The valve assembly 124 has outlet tubes 130 which are aligned with and inserted into fill passages 132 formed in the acid container 64. The fill passages 132 are in fluid communication with respective holding chambers 134. A vent tube 136 is also provided at the valve assembly 124 which tube 136 is inserted into a vent passage 138 formed in the container 64. The vent passage 138 communicates with each of the chambers 134 to permit air to escape therefrom when the acid is flowing into the chambers 134. The valve assembly 124 cam is a conventional two position valve which is opened to permit flow and closed to stop flow.

Each chamber 134 has a top baffle 140, a bottom baffle 142 and an outlet passage 144 beneath the baffle 142. The outlet passages 144 communicate with respective battery fill openings 146. When the acid container is being filled, the left end 148 thereof is the upper surface and the chambers 134 are filled to a level substantially equal to the position of the lip 150 of the outlet passage 144. After the container 64 is filled, the cradle assembly is returned to the tilted position by deactuating the power cylinder 102 to pivot the lever 104 thereby lowering the roller 114. The work table 12 can then be indexed to perform respective unloading, loading and filling operations as required.

When all of the openings 14 are occupied by empty battery cases 68 and their respective acid containers 64 are filled, the motor 24 is rotated at approximately 300 rpm. This will induce the acid to flow from the acid container to the battery case under the influence of centrifugal force. As the acid flows into the battery case, the battery case will increase in mass to cause all of the cradle assemblies 46 to pivot from the tilted position of cradle assembly 46A, shown in FIG. 2, toward a more horizontal position. The latch lever 52 is an inverted "L" shape. This places more mass above the pin 54 than below the pin 54. Due to the centrifugal forces on the latch lever 52, it is pivoted counter-clockwise about the pin 54 as viewed in FIG. 13 to release from the notch portion 82.

As the rotational speed of the work table 12 increases, the acid in the chambers 134 will be forced by centrifugal action to flow over the baffle 142 into the outlet passage 144 and therefore into the fill opening 146 thereby filling the battery cells, not shown, with acid. The rotating of the plate continues for a predetermined time permitting all of the battery cells to be filled.

The motor 24 is then slowed to a stop with one of the openings 14 being positioned in the unloading station. When the work table 12 is decelerating, the latch lever 52 remains pivoted due to the centrifugal forces. However, the assembly 36 will return to the horizontal position shown at 36A shown in FIGS. 1 and 2 because the battery case is now heavier and requires more rotary speed to remain tilted past the eighty-five degree angle at which the latch lever 52 is effective in the notch 82. When the motor stops or shortly before stopping, the latch lever 52 will return to the position shown in FIG. 3. However, the cam wheel 74 will have been returned to the position shown in FIG. 3 before the latch lever 52 is returned.

The process cycle can begin again. That is a filled battery is unloaded at the unloading station, the work table 12 is indexed, a second filled battery is removed at the unloading station while a first empty battery case 68 is loaded simultaneously at the loading station, the work table 12 is indexed, a third filled battery is removed at the unloading station, a second empty battery case 68 is loaded simultaneously at the loading station, and the acid container of the first empty acid container 64 is simultaneously filled with acid at the filling station. The indexing, unloading, loading of empty battery cases and filling of the acid container continues until all of the openings contain an empty battery case and a filled acid container. The spinning step is then performed and the cycle is repeated. As pointed out above, the latch lever 52 is automatically released from the notch 82 during the spinning step thereby eliminating a man or machine to perform the function when the unloading step is performed.

What is claimed is:

1. A method of filling electrical storage devices comprising:
   providing a circular work table with a plurality of work stations thereon each comprised of a cradle assembly including an empty acid container;
   sequentially placing an empty electrical storage device in each cradle assembly at a loading station;
   tilting and latching each cradle assembly and electrical storage device at a predetermined angle;
   sequentially filling each empty acid container with a predetermined amount of acid in a filling station;
   rotating said work table at a predetermined speed until the acid in said acid container has been displaced into said electrical storage device;
   stopping the motor rotation; and
   sequentially unloading each electrical storage device at an unloading station.

2. The method of filling electrical storage devices defined in claim 1 further comprising:
   sequentially indexing said work table with said motor to said unloading station, said loading station and said filling station until each work station has a filled acid container and an empty electrical storage device before rotating said work table at said predetermined speed.

3. The method of filling electrical storage devices defined in claim 1 further comprising:
   centrifugally unlatching said cradle at a speed equal to or less than said predetermined speed.

4. A method of filling electrical storage devices comprising:

a). providing a work table having a plurality of work stations each containing a cradle assembly including an empty acid container;

b). providing a drive motor to index said work table and to rotate said work table at a predetermined speed;

c). indexing said work table to position a first of said cradle assemblies including a first empty acid container in a loading station;

d). securing a first empty electrical storage device in the first of said cradle assemblies at a horizontal attitude;

e). tilting said first cradle assembly and said empty storage device to a predetermined angle less than ninety degrees, and latching said first cradle assembly and storage device at said predetermined angle;

f). indexing said work table to position a second of said cradle assemblies including a second empty acid container in said loading station and said first cradle assembly to a filling station;

g). securing a second empty storage device in the second of said cradle assemblies at a horizontal attitude;

h). tilting said second cradle assembly and said empty storage device to a predetermined angle less than ninety degrees, and latching said second cradle assembly and storage device at said predetermined angle;

i). filling said first empty acid container with acid;

j). repeating steps g), h), and i) until all of the cradle assemblies have a filled acid container and an empty storage device;

k). rotating said work table at a predetermined speed to:
   1). transfer the acid to each said storage device from respective ones of said acid containers, and
   2). centrifugally unlatch said cradle assemblies and storage devices;

l). stopping said work table with said cradle assemblies and said storage devices in a horizontal orientation;

m). indexing said work table to place one of said cradle assemblies and filled storage devices to an unloading station;

n). unloading said one of said filled storage devices from said work station; and o). repeating step m and n until all of said filled storage devices are unloaded.

5. An apparatus for filling electrical storage devices comprising:
   a work table having a plurality of work stations including at least a loading station, a filling station and an unloading station;
   means for rotatably mounting a cradle assembly including an acid container at each of said work stations;
   means for securing an electrical storage device in each cradle assembly in a vertical orientation in the loading station;
   means for tilting each said cradle assembly from a vertical orientation to at least a first predetermined angle less than ninety degrees in the loading station;
   means for latching said cradle assembly at said first predetermined angle;
   means for tilting said cradle assembly to a second predetermined angle of substantially ninety degrees and for returning said cradle to said first predetermined angle in said filling station;
   means for filling said acid container with acid when said cradle assembly is tilted to said second predetermined angle in said filling station;

means for rotating said work table at a speed sufficient to centrifugally transfer said acid from said acid container to said electrical storage device;

and means for centrifugally unlatching said cradle assembly to permit said cradle assembly to return to the vertical orientation when said means for rotating is discontinued.

6. The apparatus for filling electrical storage devices defined in claim 5 further comprising:

said latching means comprising a latch lever pivotally mounted on a pin and having a center of gravity radially inward and vertically outward of said pin and the axis of rotation of said cradle, and a cam wheel having a notch portion cooperating with said latch lever to retain said cradle at said first predetermined angle when said table is stationary, said latch lever releasing from said notch portion when said table is rotated at a speed sufficient for centrifugal force to cause said cradle assembly to rotate beyond said first predetermined angle and to cause said latch lever to pivot on said pin.

* * * * *